(12) United States Patent
Umezaki et al.

(10) Patent No.: US 7,518,814 B2
(45) Date of Patent: Apr. 14, 2009

(54) MAGNETIC HEAD TESTER AND METHOD OF MANUFACTURING MAGNETIC DISK DRIVE

(75) Inventors: Hiroshi Umezaki, Kanagawa (JP);
Norifumi Miyamoto, Kanagawa (JP);
Kazuhiko Washizu, Kanagawa (JP);
Takehiko Hamaguchi, Kanagawa (JP);
Kenji Itoh, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 111 days.

(21) Appl. No.: 11/515,268

(22) Filed: Sep. 1, 2006

(65) Prior Publication Data

US 2007/0046286 A1 Mar. 1, 2007

(30) Foreign Application Priority Data

Sep. 1, 2005 (JP) ............................. 2005-253272

(51) Int. Cl.
*G11B 27/36* (2006.01)
(52) U.S. Cl. ........................................................ 360/31
(58) Field of Classification Search .................. 360/31, 360/69, 324.1, 324.12, 236.2, 234.6, 323, 360/244.5, 245.2, 265.7; 324/210; 702/118; 29/603.1, 603.03; 204/192.12, 298.12
See application file for complete search history.

(56) References Cited

U.S. PATENT DOCUMENTS

| 4,943,875 | A | * | 7/1990 | Reidenbach et al. ...... 360/245.2 |
| 5,296,984 | A | * | 3/1994 | Fick .......................... 360/244.5 |
| 5,313,355 | A | * | 5/1994 | Hagen ....................... 360/244.5 |
| 5,706,080 | A | * | 1/1998 | Pekin et al. ...................... 356/72 |
| 6,373,243 | B1 | | 4/2002 | Takano et al. |
| 6,469,872 | B1 | * | 10/2002 | Kant et al. ................ 360/265.7 |
| 6,560,852 | B2 | * | 5/2003 | Liem et al. ............... 29/603.03 |

(Continued)

FOREIGN PATENT DOCUMENTS

JP 05-120646 5/1993

OTHER PUBLICATIONS

Itagaki, Tomoyuki et al., "HDD Emulation System for Head/Disk Evaluation", *The Institute of Electronics, Information and Communication Engineers*, vol. 103, No. 495, MR 2003 pp. 39-44, Dec. 12, 2003.

*Primary Examiner*—Fred Tzeng
(74) *Attorney, Agent, or Firm*—Townsend and Townsend and Crew LLP; John Henkhaus

(57) ABSTRACT

Embodiments of the invention provide an inexpensive magnetic head tester employing component parts of a production HDD and capable of exercising functions very close to those of a production HDD. In one embodiment, a magnetic head tester employs the VCM actuator and the control circuit of a production HDD and has a lightweight, simple HGA fixing mechanism mounted on an actuator arm. The HGA fixing mechanism fixes an HGA to the actuator arm by a method using a very light holding spring mounted on the arm, a method of mechanically clamping an HGA by using air pressure, or a method of fixing an HGA to the arm by elastically deforming a rubber clamping member by air pressure. Servo control is achieved by the actuator of a production VCM. An end part of the VCM actuator is stopped by a stopping mechanism and is held by a holding spring to prevent the runaway of the VCM actuator. Servo control is performed by balancing the driving force of the VCM and the resilience of the spring.

18 Claims, 11 Drawing Sheets

U.S. PATENT DOCUMENTS

| | | | |
|---|---|---|---|
| 6,582,572 B2* | 6/2003 | McLeod | 204/298.12 |
| 6,605,195 B2* | 8/2003 | McLeod | 204/192.12 |
| 6,777,929 B2* | 8/2004 | Fang et al. | 324/210 |
| 7,051,423 B2* | 5/2006 | Gouo | 29/603.03 |
| 7,076,391 B1* | 7/2006 | Pakzad et al. | 702/118 |
| 7,121,133 B2* | 10/2006 | Chu et al. | 73/1.89 |
| 7,127,799 B2* | 10/2006 | Girard et al. | 29/603.1 |
| 7,193,822 B2* | 3/2007 | Shimizu et al. | 360/324.1 |
| 7,236,334 B2* | 6/2007 | Ding et al. | 360/323 |
| 7,292,401 B2* | 11/2007 | Shen et al. | 360/69 |
| 2001/0036026 A1* | 11/2001 | Chen et al. | 360/31 |
| 2005/0195536 A1* | 9/2005 | Kagami et al. | 360/324.12 |
| 2005/0280943 A1* | 12/2005 | Inoue et al. | 360/236.2 |
| 2006/0053621 A1* | 3/2006 | Ichimura et al. | 29/603.03 |
| 2006/0066298 A1* | 3/2006 | Grinberg et al. | 324/210 |
| 2006/0119354 A1* | 6/2006 | Che et al. | 324/210 |
| 2006/0139809 A1* | 6/2006 | Matsumoto et al. | 360/234.5 |
| 2007/0002494 A1* | 1/2007 | Takahashi et al. | 360/234.6 |
| 2007/0137024 A1* | 6/2007 | Yao et al. | 29/603.03 |

* cited by examiner

MAGNETIC HEAD TESTER AND METHOD OF MANUFACTURING MAGNETIC DISK DRIVE

CROSS-REFERENCES TO RELATED APPLICATIONS

This application claims priority from Japanese Patent Application No. JP2005-253272, filed Sep. 1, 2005, the entire disclosure of which is incorporated herein by reference.

BACKGROUND OF THE INVENTION

The present invention relates to a magnetic head testing method of testing and choosing a magnetic head for a magnetic disk drive or hard disk drive (abbreviated to "HDD") and a method of manufacturing an HDD employing a chosen magnetic head.

Choosing a good magnetic head is essential to ensure the satisfactory quality of an HDD and to manufacture HDDs at a high yield. Generally, a head gimbals assembly (abbreviated to "HGA") built by assembling a magnetic head and gimbals is subjected to a dynamic electric test. In the dynamic electric test, parameters of the magnetic head including output, overwrite, resolution and track width are measured. Magnetic heads which are expected to operate satisfactorily in HDDs are chosen on the basis of measured results. A conventional dynamic electric tester (abbreviated to "DET") includes a precision spin stand for rotating a disk, a precision position control system for accurately controlling the position of the head during write and read operations, and a high-performance electronic circuit system having abilities to achieve write and read operations equivalent to those of products. The precision spin stand, the precision position control system and the high-performance electronic circuit system are very expensive and the price of the DET is tens of millions yens. Thus a huge sum of money is necessary for preparing many DETs. The measured parameters, namely, output, overwrite, resolution and track width, are indirect parameters. Bit error rate (abbreviated to "BER"), which is the most important parameter of the HDD, has not hitherto been measured in the mass-production line owing to restrictions imposed by time necessary for measurement and costs of testers.

Studies have been made to use the parts of a production HDD for building a DET to provide an inexpensive DET. For example, a spin stand unlimitedly resembling that of a practical HDD is mentioned in Reference Document 1 (IEICE Technical Report, vol. 103, No. 495, MR2003-39-44, "2.1 Spin Stand", p. 1, right col., line 5 to p. 2, left col. and "2.4 Signal Processing", p. 3, right col. to p. 4, left col., line 5). This known spin stand is designed to use functions provided by a practical spindle motor and voice coil motor (abbreviated to "VCM") so as to facilitate changing a magnetic head and a magnetic disk. It is mentioned in Reference Document 1 that real-time track following by means of a VCM can be achieved by demodulating servo-information written to a magnetic disk by a partial response maximum likelihood chip (PRML chip). A magnetic disk testing apparatus disclosed in Patent Document 1 (Japanese Patent Laid-open No. 2001-110126) uses a VCM actuator and discloses a spin stand of a mechanism equivalent to that of a practical HDD. A fixing mechanism disclosed in Patent Document 2 (Japanese Patent Laid-open No. 5-120646) fixes an HGA with a free end of a spring.

BRIEF SUMMARY OF THE INVENTION

Attempts have been made to develop an inexpensive DET using parts of a practical HDD. However, there are problems to be solved when such a DET based on known techniques is used as a magnetic head testing apparatus. For example, the magnetic disk testing apparatus mentioned in Patent Document 1 has unsolved problems in changing the HGA. Magnetic disks are loaded successively into the magnetic disk testing apparatus for testing. Usually, the HGA is not changed until the same is broken and hence the frequency of changing the HGA is very low. Therefore, the HGA is fastened to the arm of the VCM actuator with a screw and the HGA is changed manually. The HGA of the magnetic disk testing apparatus needs to be changed every time a test cycle is completed. Frequent change of the HGA by unfastening and fastening the screw is not desirable because productivity will be reduced and manual changing of the HGA is likely to cause electrical and mechanical damage. According to Reference Document 1, a head and a disk can be tested and the HGA is fastened manually to the actuator arm with a screw.

Accordingly, it is a first object of the present invention to achieve quickly and safely attaching an HGA to and quickly and safely removing the HGA from the arm of a VCM actuator. A fixing mechanism for fixing the HGA to the arm should be as light as possible to avoid obstructing servo operations of the arm by the VCM. It is desirable to attach the HGA to and remove the HGA from the arm by an automatic mechanism to avoid causing electrical and mechanical damage by manual operations.

A second object of the present invention is to provide a runaway avoidance mechanism capable of avoiding the runaway of a VCM actuator. A VCM actuator performs servo operations by using the liner relations between current supplied to a coil and angular displacement of an actuator. It is possible that the actuator runs away when an excessively high current is supplied accidentally to the coil due to defective servo information. It is important to prevent the runaway of production HDDs. A method of operating a VCM actuator employed in a magnetic head testing apparatus according to the present invention is considerably different from that of operating a VCM actuator included in a production HDD, and a runaway avoidance mechanism of the magnetic head testing apparatus according to the present invention is basically different from that of the production HDD. Nothing about the runaway of a VCM actuator is mentioned in both Patent Document 1 and Reference Document 1.

A third object of the present invention is to generate a servo pattern on a disk to be used by a tester. A recently developed DET uses a precision spindle motor and a precision piezoelectric actuator for positioning a head with a positioning accuracy dependent on the mechanical accuracies of the precision spindle motor and the precision piezoelectric actuator to avoid the increase of the cost of the tester by using a servomechanism. However, the recent DET is required to employ a servomechanism by the recent reduction of the track width of products. Actually, a DET provided with a servomechanism is marketed. The known DET uses a piezoelectric actuator for precision position control and is provided with a servomechanism, which is basically different from a servomechanism for a VCM actuator examined by the present invention. The VCM actuator of a practical HDD performs servo operations. Essential parts of the present invention are the same as the practical HDD. However, the tester of the present invention performs special servo operations specific to the tester and hence the servomechanism of a practical HDD cannot be employed without alteration.

The present invention developed the following three methods to meet the first object. A first HGA fixing method uses a plate spring attached to an end part of a VCM arm and presses the mount plate of an HGA against a stopper on the VCM arm by the plate spring to fasten the HGA to the VCM arm. One of the opposite end parts of the plate spring pushes one side of a staking hole formed in the mount plate toward the stopper and the other end part of the plate spring is fixed to a lower part of the VCM arm. The plate spring is formed in the least possible mass. When the HGA is attached to and is removed from the VCM arm, a curved part of the plate spring underlying the VCM motor is depressed by a pusher mounted on the tester to separate the end part of the plate spring from the end of the staking hole. Consequently, the HGA is released from the VCM arm. Thus the HGA can be attached to and removed from the VCM arm by a simple pick & place operation. The simple pick & place operation can be achieved by an automatic machine. A groove and a stopper are formed at desired positions, respectively, in the VCM arm to place the HGA at a predetermined position on the VCM arm. The position of the HGA with respect to the length of the VCM arm is determined by bringing the mount plate into contact with the stopper and the position of the HGA with respect to a direction perpendicular to the length of the VCM arm is determined by engaging the mount plate in the groove.

A second HGA fixing method uses air pressure. An air cylinder actuator and clamping arms are placed in an HGA holding part of a VCM arm. The air cylinder actuator pulls the clamping arms down to fasten an HGA to the HGA holding part. The air cylinder actuator pushes the clamping arms up when an HGA is attached to and removed from the VCM arm. The assembly of the clamping arms is long and thin, extends upward and has a diameter smaller than the diameter of a staking hole formed in the mount plate of an HGA. The extended assembly of the clamping arms is passed through the staking hole to attach the HGA to and to remove the HGA from the VCM arm by a simple pick & place operation.

A third HGA fixing method uses air pressure. The third HGA fixing method does not use any air cylinder actuator and uses an elastically deformable member made of rubber. A rubber clamping member made of rubber and a rubber clamping member fixing member are placed in an HGA holding part of a VCM arm. The rubber clamping member is deflated by sucking out air from the rubber clamping member to fasten an HGA to the HGA holding part of the VCM arm. The deflated rubber clamping member presses an edge part around a staking hole formed in a mount plate of the HGA to the VCM arm to fasten the HGA to the VCM arm. The rubber clamping member is inflated by supplying air into the rubber clamping member to remove the HGA from the VCM arm. The inflated rubber claming member extends upward in a long, thin shape. Thus the rubber clamping member is extended in the long, thin shape so that the rubber clamping member is able to pass through the staking hole of the mount plate for a simple pick & place operation.

The foregoing three HGA fixing methods are featured by the use of very light HGA fixing mechanisms. It is an essential condition that the HGA fixing mechanism is light for the VCM actuator to operate similarly to a production HDD. Each of the HGA fixing mechanism is mounted on the one of the plurality of arms of a production VCM and the rest of the arms are cut off so that the sum of the masses of the arm, the cut arms and the HGA fixing mechanism is equal to the sum of the masses of the normal arms. Therefore, the standard mass of the HGA fixing mechanism must be equal to the sum of the masses of the cut parts of the arms.

Another feature of the HGA fixing methods is that the height of a protruding part of the fixing part of the HGA fixing mechanism holding an HGA protruding upward from the staking hole is not greater than a predetermined height. Such a height of the protruding part is a necessary condition for preventing the clamping mechanism from coming into contact with a disk in testing a magnetic head because the clamping mechanism lies above the disk.

The second object of the present invention is achieved by a mechanism that prevents the runaway of a VCM actuator. Usually, measurement for the dynamic electric test of an HGA in a mass production line is performed only at a position corresponding to a radially middle part of the disk to complete the dynamic electric test of the HGA in the least necessary time. The present invention performs the dynamic electric test of an HGA in the same mode. The servo control of the VCM actuator needs to be performed only in the vicinity of a position corresponding to the radially middle part of the disk. The present invention forms a projection on the outside of the coil of a VCM actuator and provides a tester with a hard stopper for stopping the projection at a position corresponding to the radially middle part of the disk. The present invention uses a mechanism to move a VCM holding spring so as to push the back side of the projection after the projection has come into contact with the hard stopper. Thus the projection is held between the hard stopper and the VCM holding spring immediately before the start of the servo control operation. Then, the servo control operation is started. The position of the VCM with respect to a track is controlled by balancing the driving force of the VCM and the strength of the VCM holding spring. In this state, the VCM actuator will not run away even if an excessively high current flows through the VCM coil.

The present invention includes a method of providing the tester with a self servo writing function (SSW function) to achieve the third object of the present invention, i.e., the generation of a servo pattern on a disk. This method generates a servo pattern in the casing of the tester. Therefore, an accurate servo pattern with small shift of disk center and small asynchronism can be generated. A SSW control circuit is equivalent to that employed in a production HDD and is very inexpensive as compared with a special servo pattern generating circuit employed in the conventional DET. The tester needs to generate a servo pattern only at a position in the vicinity of the radially middle part and the servo pattern can be generated in a time far shorter than that needed by a production HDD.

The magnetic head tester of the present invention including many parts of a production HDD can be manufactured at a very low cost. Automatic HGA attaching and removing operation performed by the automatic machine improves operability and avoids causing electrical and mechanical damage by manual operations. Since the test uses a production card, the performance of the head of a production HDD can be more correctly evaluated. The abilities of the production HDD make remarkable progress with time and hence it is difficult for the conventional DET to cope with the progress. Improvements in production HDDs can be directly incorporated into the tester because the approach according to the present invention uses the production card.

DETAILED DESCRIPTION OF THE INVENTION

Figure 1:
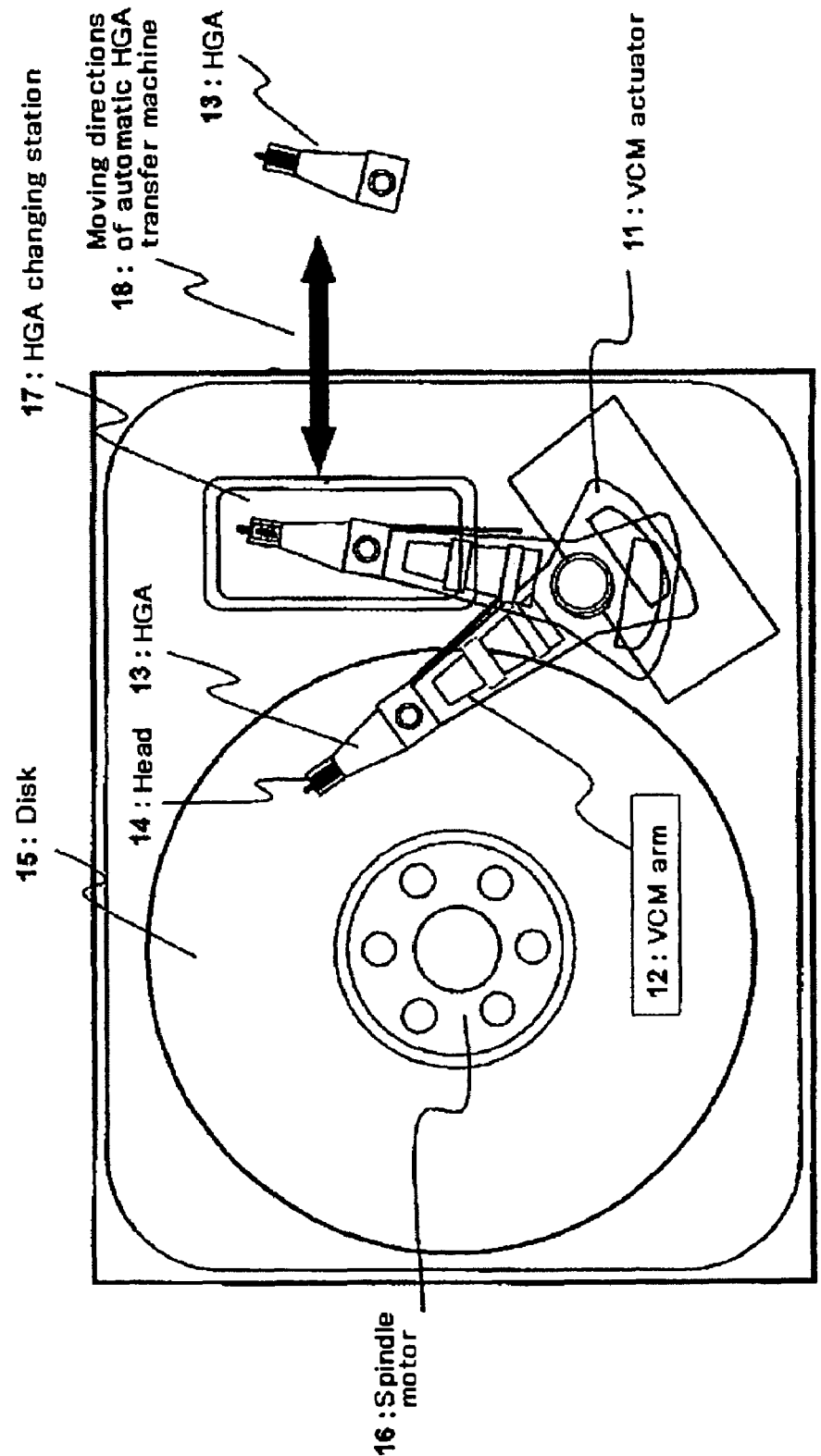
FIG. 1 is a schematic view of a magnetic head tester according to an embodiment of the present invention.

Referring to FIG. 1 showing a schematic view of a magnetic head tester according to an embodiment of the present invention, the magnetic head tester is provided with a VCM actuator 11, a disk 15 and a spindle motor 16. The VCM actuator 11, the disk 15 and the spindle motor 16 are those of a production HDD. The distance between a VCM and the disk, and the respective heights of the VCM and the disk from the bottom surface of the magnetic head tester are equal to those in the production HDD. The magnetic head tester differs from the production HDD in that the arm of the VCM actuator is provided with an HGA fixing mechanism for detachably holding an HGA on the arm, and an HGA changing station 17 where HGAs are changed. During the test of a magnetic head 14, the magnetic head 14 held on the VCM arm 12 of the VCM actuator 11 is held at a position corresponding to a radially middle part of the disk 15. HGAs are changed at the HGA changing station 17. At the HGA changing station 17, a fixing mechanism releases an HGA, the HGA is simply put on the VCM arm and simply removed from the VCM arm by a simple pick & place operation. The pick & place operation is carried out by an automatic transfer mechanism, which is not shown.

Embodiment 1

Figure 2:
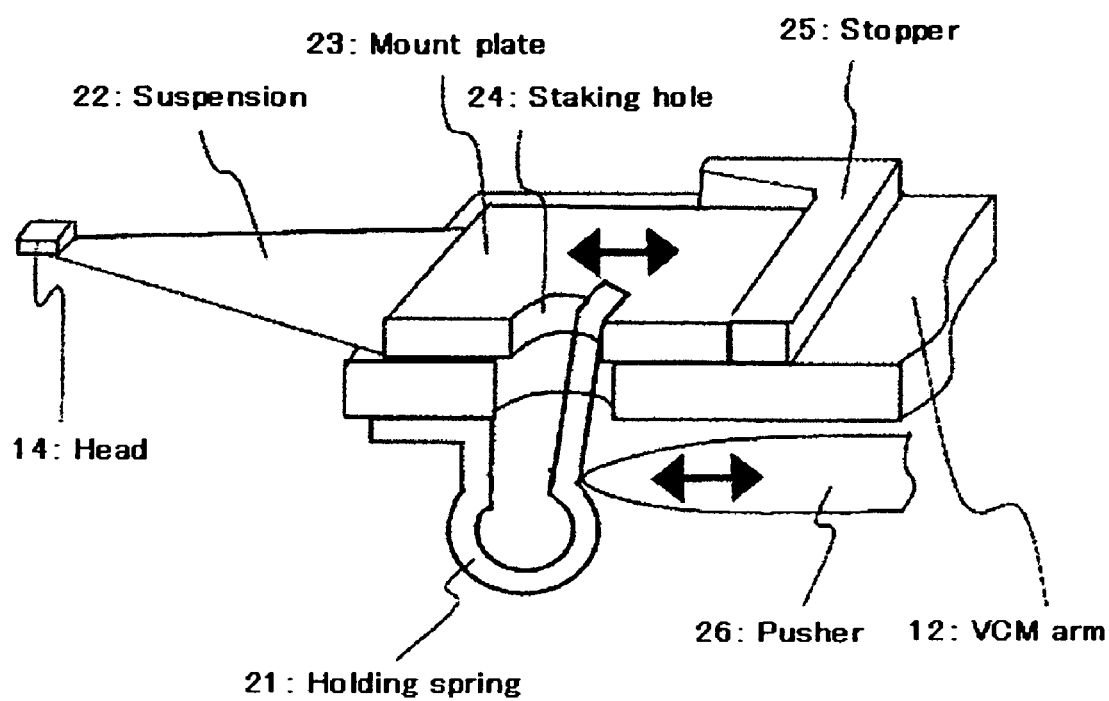
FIG. 2 is a perspective view of an HGA fixing mechanism provided with a holding spring according to a first embodiment and included in the magnetic head tester of the present invention.

A magnetic head tester in Embodiment 1 uses a holding spring 21 for holding an HGA in place as shown in FIG. 2. The holding spring 21 has a first end part fixed to a lower part of the VCM arm 12 and a second end part pressed against one side of a staking hole 24 formed in an HGA mount plate 23 included in the HGA. This spring force is applied to the HGA. The holding spring 21 presses the HGA mount plate 23 elastically against a stopper 25. To remove the HGA from the VCM arm 12, a pusher 26 included in the magnetic head tester is brought into engagement with a curved part of the holding spring 21 and pushes the curved part of the holding spring 21 to the left, as viewed in FIG. 2, to separate the second end part of the holding spring 21 from the side of the staking hole 24. The HGA thus released from the holding spring 21 can be attached to and removed from the VCM arm 12 by a simple pick & place operation.

Figure 3:
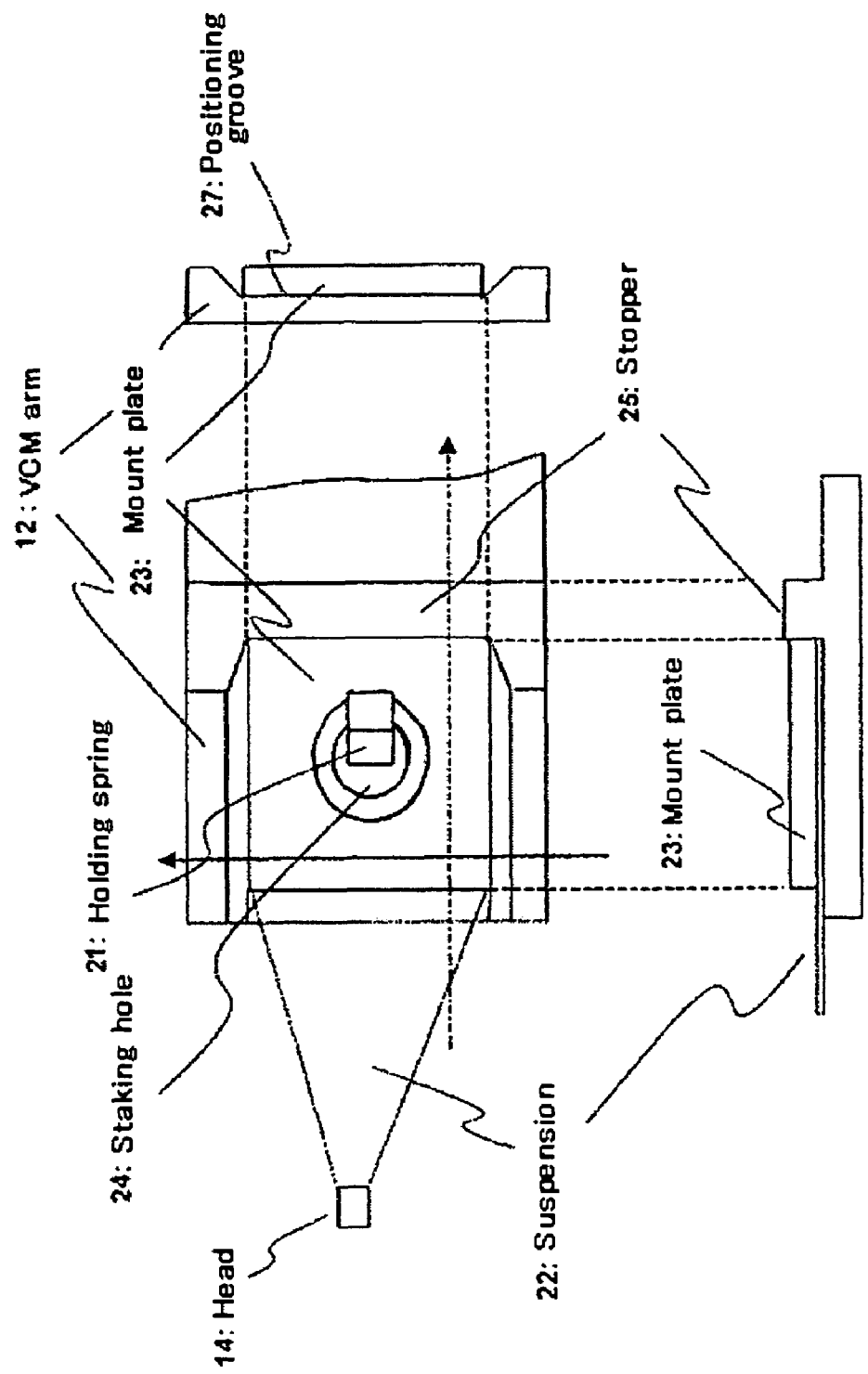
FIG. 3 is a front elevation, a side elevation and a rear view of the HGA fixing mechanism shown in FIG. 2.

FIG. 3 shows an HGA positioning structure. The HGA is positioned on the VCM arm 12 by positioning groove 27 formed in the VCM arm 12 and the stopper disposed on the VCM arm 12. The position of the HGA with respect to the length of the VCM arm 12 is determined by the stopper 25. A mount plate 23 is pressed against the stopper 25 to position the HGA with respect to the length of the VCM arm 12. The position of the HGA with respect to the width of the VCM arm 12 is determined by the positioning groove 27. The mount plate 23 is engaged in the positioning groove 27 to position the HGA with respect to the width of the VCM arm 12.

Figure 4:
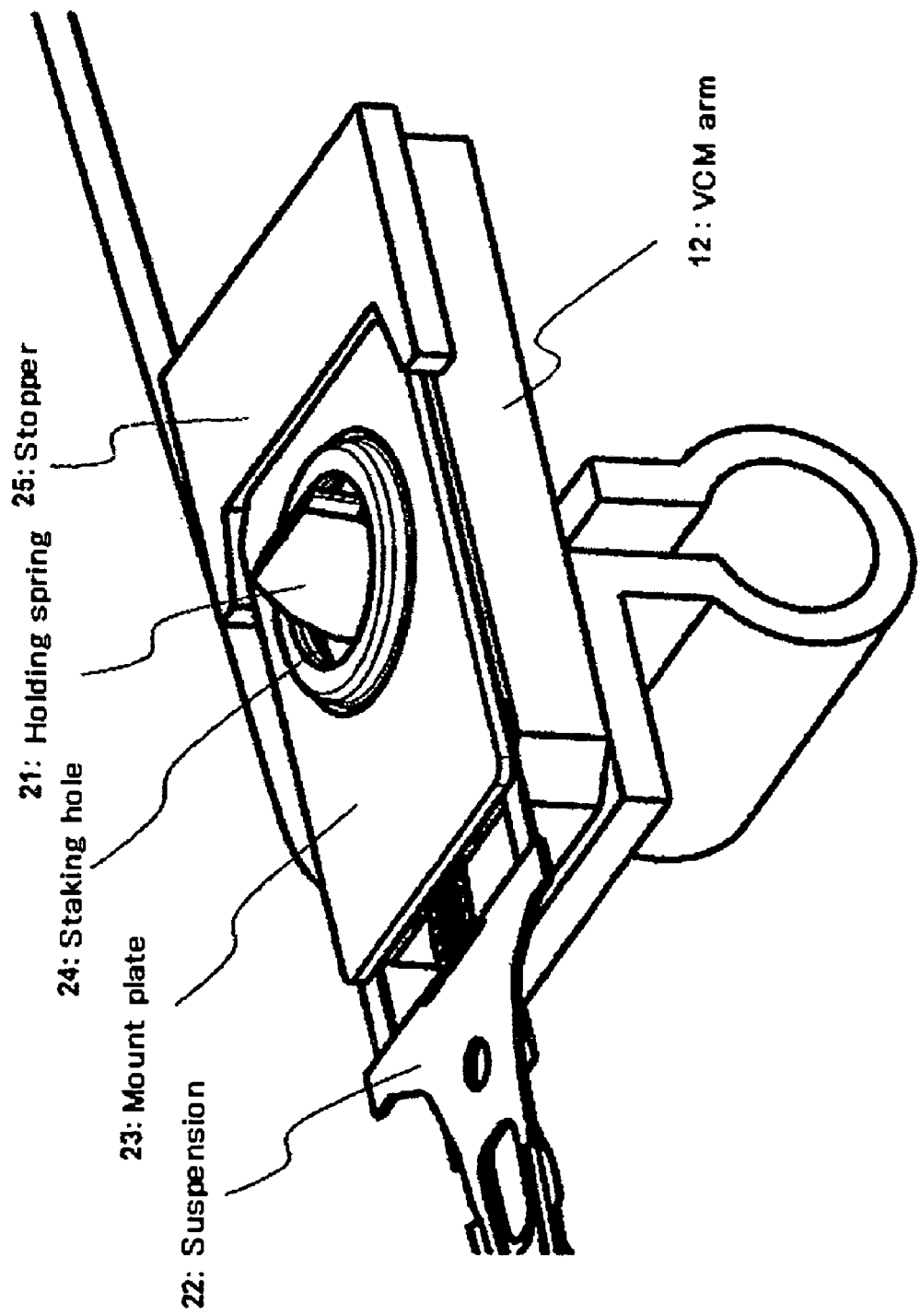
FIG. 4 is a perspective view of the HGA fixing mechanism shown in FIG. 2.

FIG. 4 is a perspective view of the magnetic head tester in Embodiment 1 using the holding spring 21. An HGA holding structure for holding the HGA in place on the VCM arm 12 includes only the holding spring 21 and the stopper 25 added to the VCM arm 12. The HGA holding structure is very light and very simple in construction. Therefore, the HGA holding structure can be mounted on the VCM actuator of a production HDD. The fixing and releasing mechanism for a spring and HGA disclosed in Patent Document 2 is an assembly of metal parts and has a weight far greater than the sum of the respective weights of the VCM arm and an HGA. Therefore, this known fixing mechanism cannot be mounted on the VCM actuator of an HDD and can be driven only by a linear motor or a piezoelectric actuator.

Embodiment 2

Figure 5:
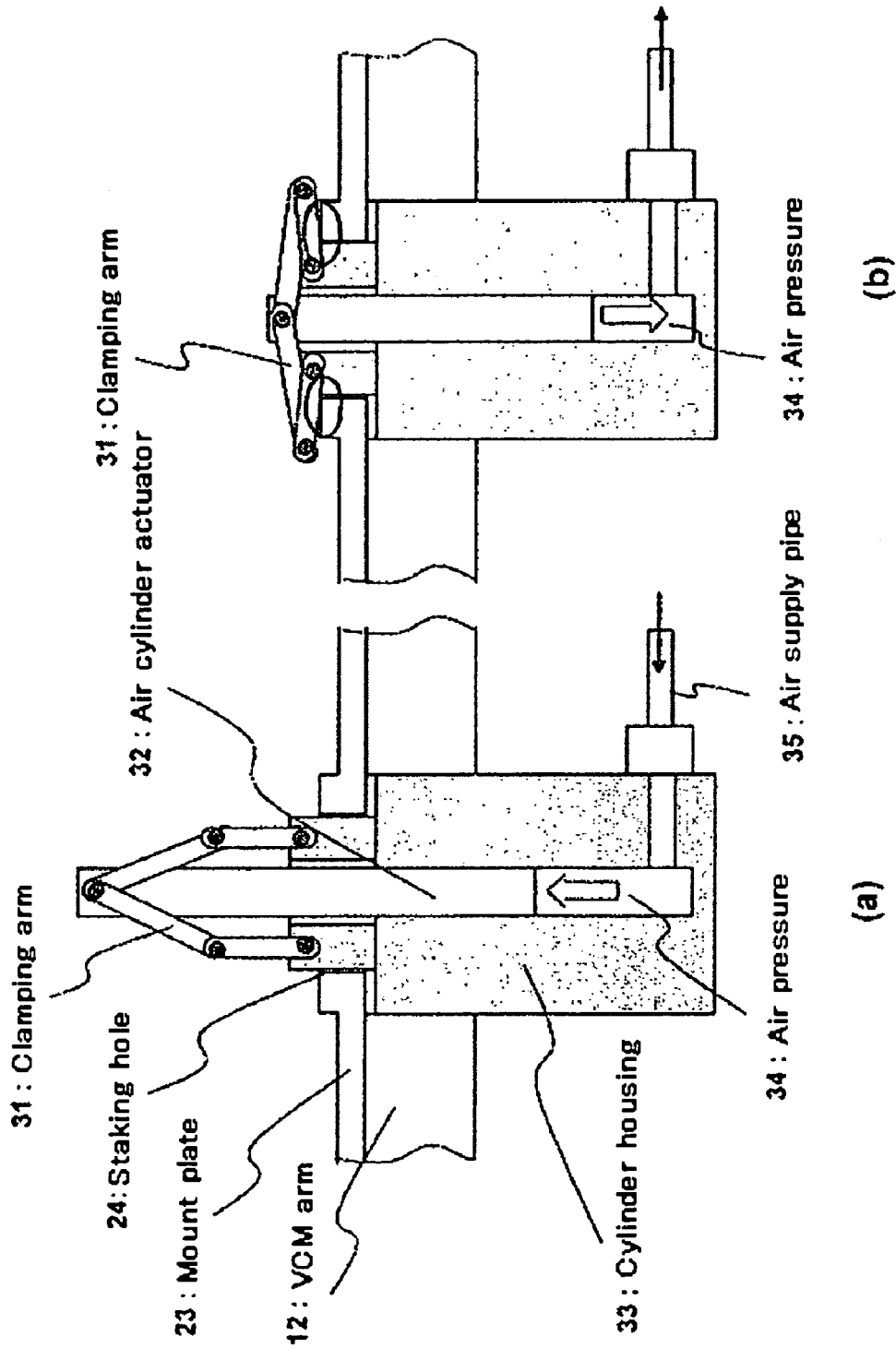
FIG. 5 is a sectional view of an HGA fixing mechanism using air pressure, including four clamping arms and employed in a second embodiment of the present invention.

FIG. 5 shows an HGA fixing mechanism that uses air pressure for fixing the HGA to the VCM arm 12 by way of example. FIGS. 5(a) and 5(b) show the HGA fixing mechanism in an HGA releasing condition and in an HGA fixing condition, respectively. In the HGA releasing condition, an air cylinder actuator 32 pushes up a clamping arm 31 to extend the clamping arm 31. The outside diameter of the thus extended clamping arm 31 is smaller than the diameter of the staking hole 24 formed in the mount plate 23. Therefore, the clamp plate 23 of the HGA can be removed from the extended clamping arm 31 by a pick & place operation. In the HGA fixing condition shown in FIG. 5(b), the air cylinder actuator 32 pulls down the clamping arm 31 so that lower arm members of the clamping arm 31 press the mount plate 23 against the VCM arm 12.

Embodiment 3

Figure 6:
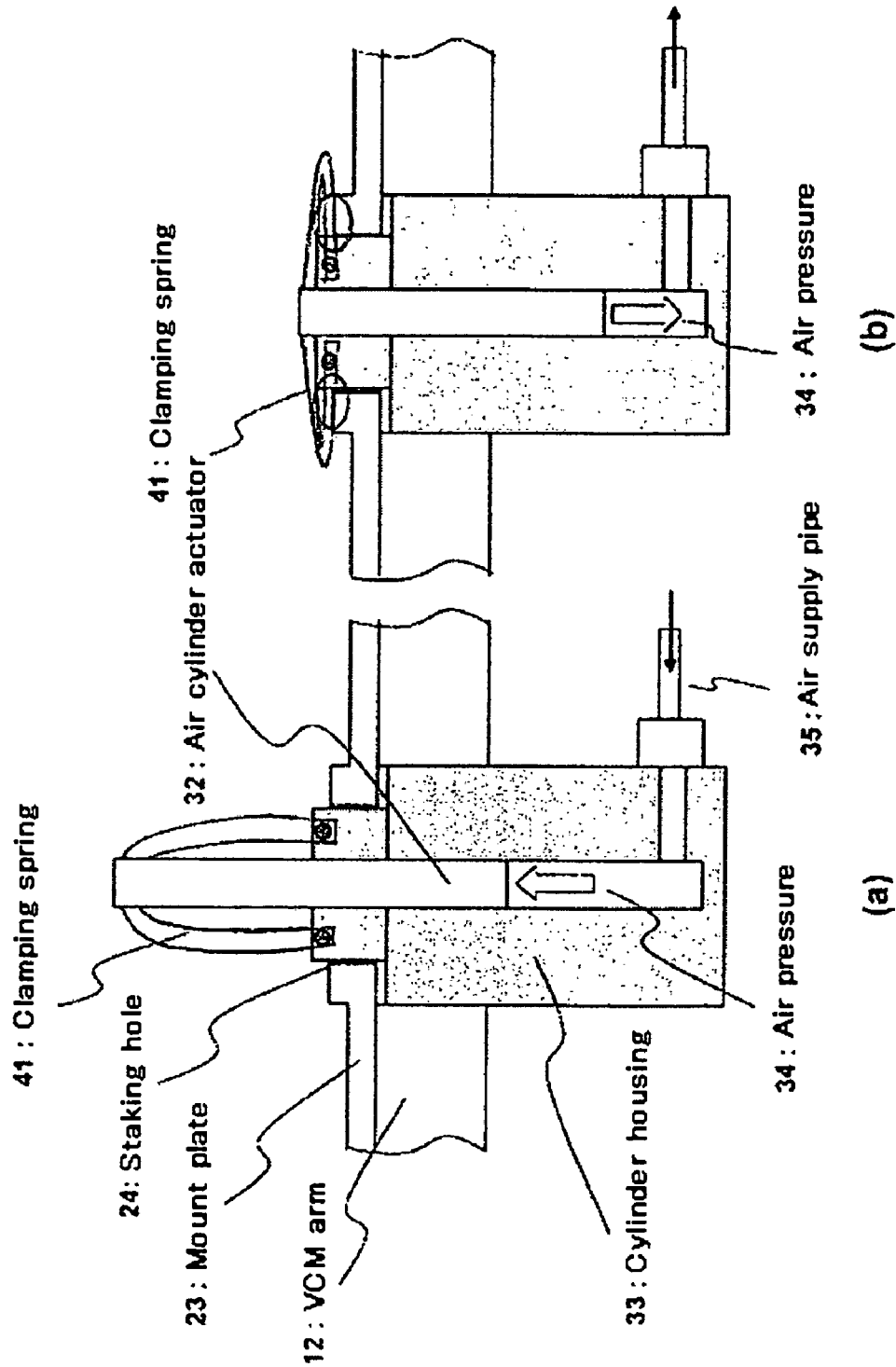
FIG. 6 is a sectional view of an HGA fixing mechanism using air pressure, including a single clamping spring and employed in a third embodiment of the present invention.

FIG. 6 shows another HGA fixing mechanism in Embodiment 3 that uses air pressure for fixing the HGA to the VCM arm 12. FIGS. 6(a) and 6(b) show the HGA fixing mechanism in an HGA releasing condition and in an HGA fixing condition, respectively. This HGA fixing mechanism includes a clamping spring 41 instead of the clamping arm 31. Although this HGA fixing mechanism in Embodiment 3 is substantially the same as the HGA fixing mechanism in Embodiment 2 in the principle of operation, the clamping spring 41 is a single member while the clamping arm 31 has the four arm members. Thus, the HGA fixing mechanism in Embodiment 3 is very simple in construction.

Embodiment 4

Figure 7:
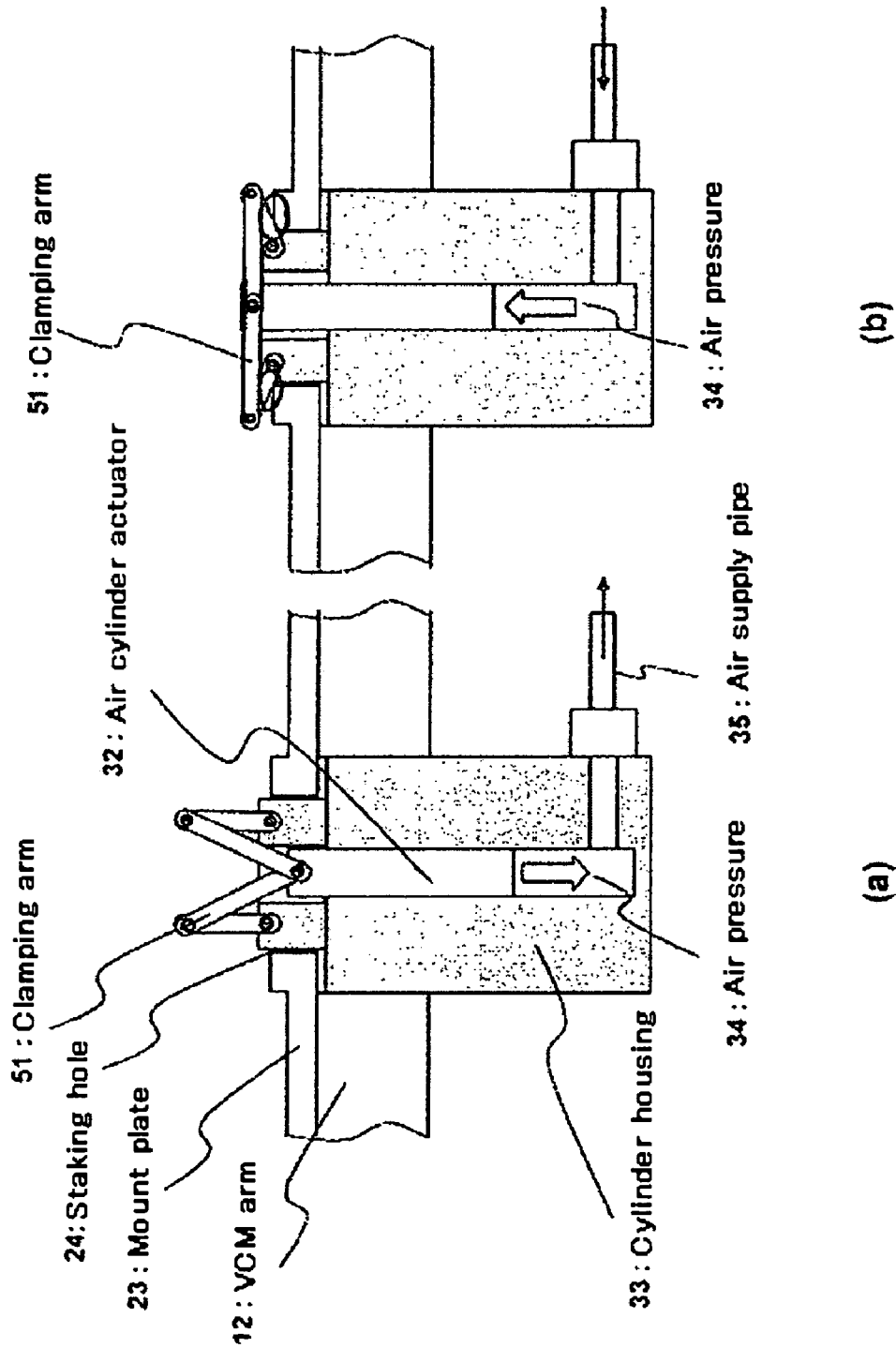
FIG. 7 is a sectional view of an HGA fixing mechanism using air pressure, including four clamping arms and employed in a fourth embodiment of the present invention.

FIG. 7 shows an HGA fixing mechanism that uses air pressure for fixing the HGA to the VCM arm 12 by way of example. FIGS. 7(a) and 7(b) show the HGA fixing mechanism in an HGA releasing condition and in an HGA fixing condition, respectively. The construction of a clamping arm 51 is different from that of the clamping arm 31 of the HGA fixing mechanism in Embodiment 2. An air cylinder actuator 32 pulls the clamping arm 51 to set the clamping arm 51 in the HGA releasing condition and pushes the clamping arm 51 to set the clamping arm 51 in the HGA fixing condition.

Embodiment 5

Figure 8:
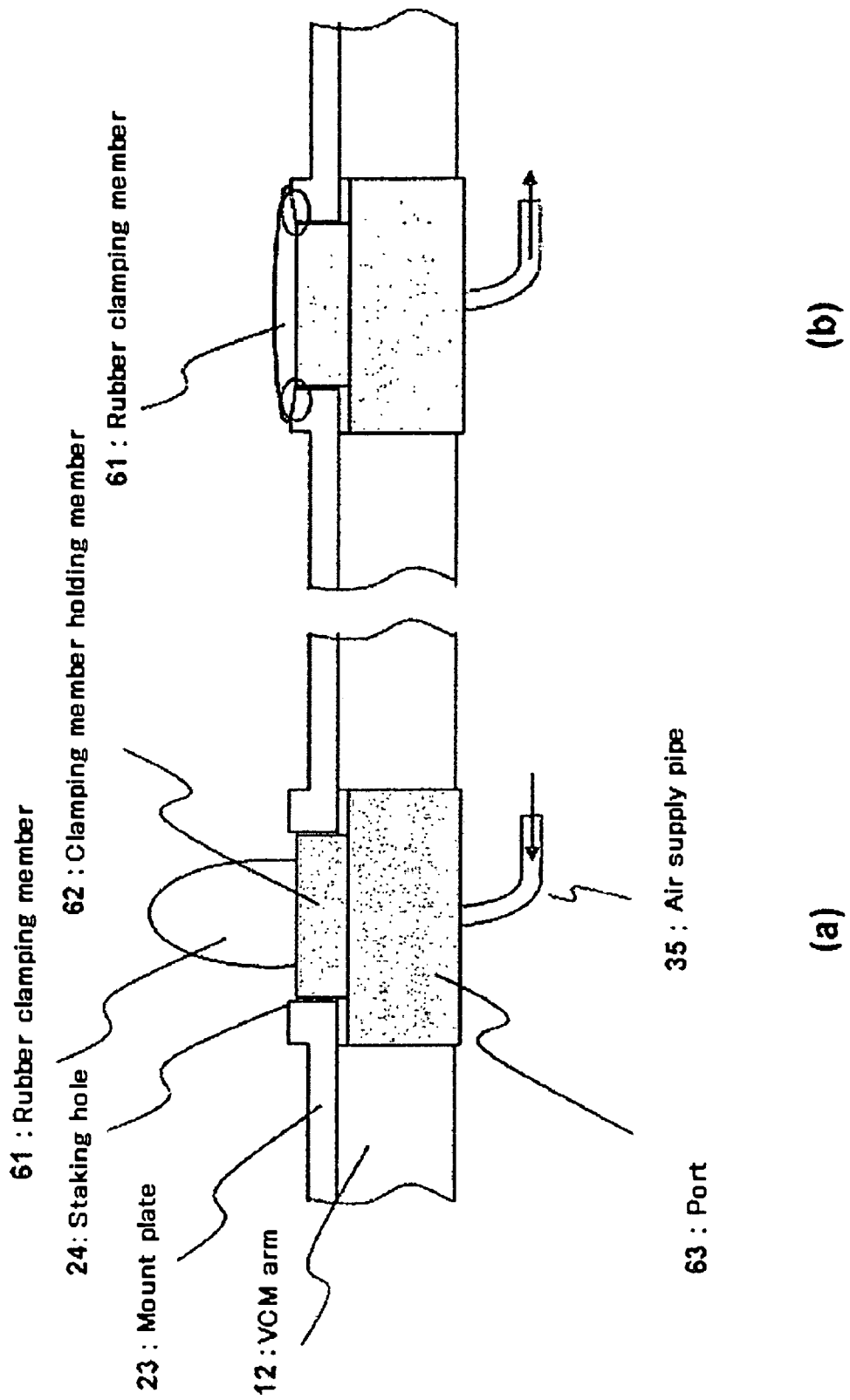
FIG. 8 is a sectional view of an HGA fixing mechanism using air pressure, including a rubber clamping member and employed in a fifth embodiment of the present invention.

FIG. 8 shows an HGA fixing mechanism that uses air pressure for fixing the HGA to the VCM arm 12 by way of another example. FIGS. 8(a) and 8(b) show the HGA fixing mechanism in an HGA releasing condition and in an HGA fixing condition, respectively. The HGA fixing mechanism does not use any air cylinder actuator and uses a rubber claming member 61 for fixing the HGA to the VCM arm 12. The rubber clamping member 61 is fastened to an HGA holding part of the VCM arm 12 by a clamping member holding member 62. The rubber clamping member 61 is inflated so as to extend upward in a long, thin shape by supplying air through an air supply pipe 35 to the rubber clamping member 61 to set the rubber clamping member 61 in an HGA releasing condition. A pick & place operation for removing the HGA from the VCM arm 12 raises the HGA such that the inflated rubber clamping member 61 is extracted from the staking hole 24. The rubber clamping member 61 is deflated in a flat shape by sucking air out of the rubber clamping member 61 through the air supply pipe 35 to set the rubber clamping member 61 in an HGA fixing condition. The deflated rubber clamping member 61 presses the mount plate 23 against the VCM arm 12.

Those four HGA fixing methods using air pressure need the air supply pipe 35 to use air pressure. The air supply pipe 35 is extended along the VCM arm so that the air supply pipe 35 may not obstruct the turning motion of the VCM arm. The air supply pipe 35 is connected to a tester body by a flexible structure.

Embodiment 6

Figure 9:
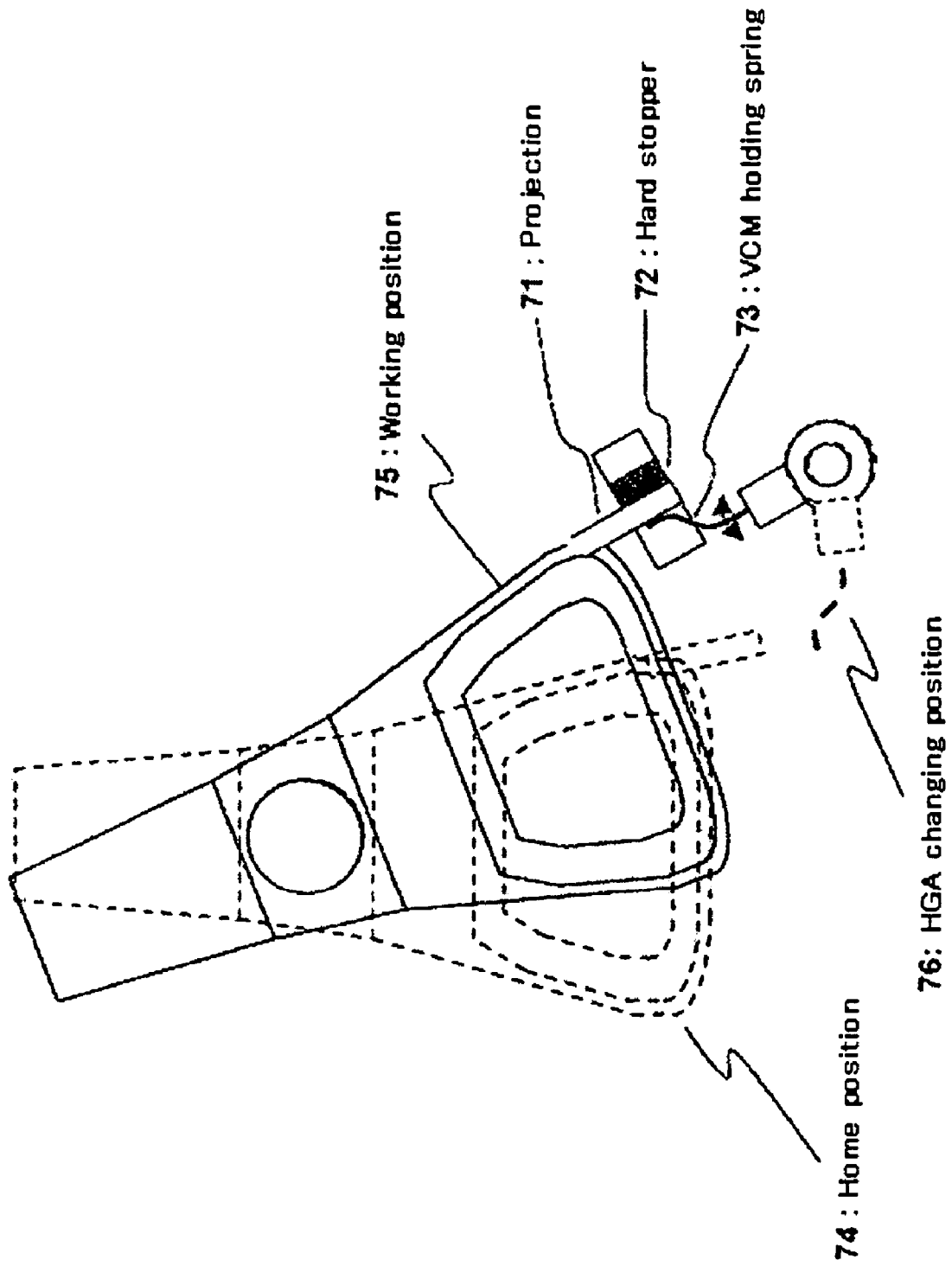
FIG. 9 is a front elevation of a mechanism for preventing the runaway of a VCM actuator included in an embodiment of the present invention.

FIG. 9 shows a runaway preventing mechanism included in a magnetic head tester in Embodiment 6 to prevent the runaway of the VCM actuator. This magnetic head tester places a magnetic head at a testing position corresponding to a radially middle part of the disk. The VCM arm is turned from a home position 74 where an HGA is fixed to or removed from the VCM arm to a working position 75 to position the magnetic head at the testing position. A projection 71 is formed on the outer side of a VCM coil. The magnetic head tester is provided with a hard stopper 72. When the VCM arm is turned to the working position 75, the projection comes into contact with the hard stopper 72 to stop the VCM arm mechanically at the working position 75. After the projection 71 has engaged with the hard stopper 72, a VCM holding spring 73 is turned to press the projection 71 against the hard stopper 72. Thus the projection 71 is held between the hard stopper 72 and the VCM holding spring 73 immediately before the start of a servo control operation in a radially middle part of the disk. Then, the servo control operation is started. The position of the VCM with respect to a track is controlled by balancing the driving force of the VCM and the strength of the VCM holding spring 73. In this state, the VCM actuator will not runaway even if an excessively high current flows through the VCM coil.

Embodiment 7

Figure 10:
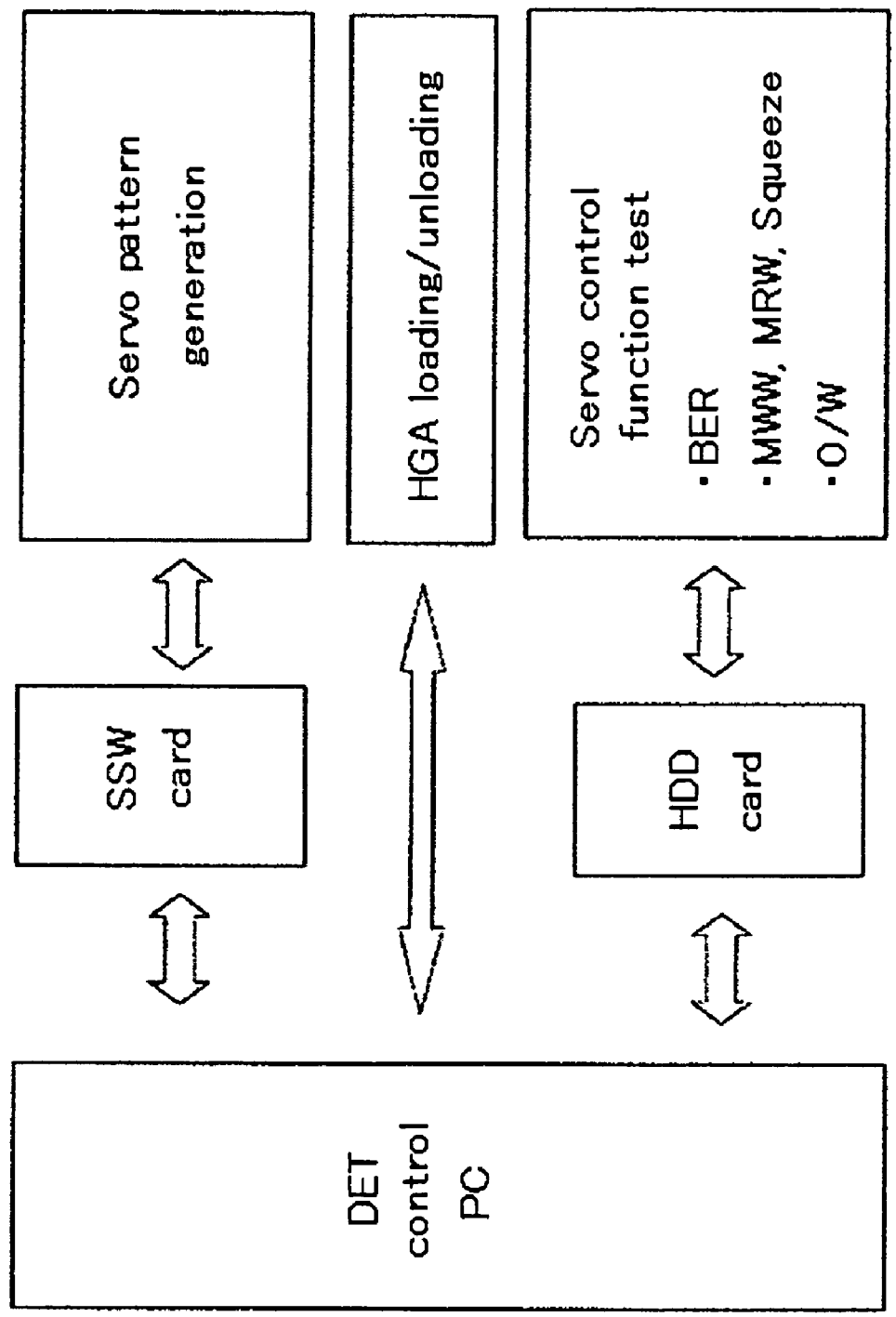
FIG. 10 is a block diagram of a magnetic head testing system according to the present invention.

FIG. 10 is a block diagram showing a magnetic head tester in Embodiment 7. A self servo writing control circuit (SSW control circuit) employed by a production HDD is used for generating a servo pattern on a disk. A new disk is installed before starting a test and a servo pattern for a VCM actuator is generated on the disk by the SSW control circuit. The magnetic head tester needs a servo pattern only in a radially middle part of the disk. Therefore, the servo pattern can be generated in a short time far shorter than that needed by a production HDD.

FIG. 10 shows also a servo control method and a test parameter measuring method. An HDD card, namely, a card loaded with an electronic control circuit for a production HDD, controls all the writing and reading operations of the HDD. The present invention employs the VCM actuator and servo techniques of a production HDD. The servo control is performed through the HDD card. The HDD card enables the tester to carry out all sorts of measurement which are performed by a production HDD. For example, the tester is able to measure BER (bit error rate) under the same conditions as a production HDD. The newest channel IC can accomplish the measurement of BER in a short time and contributes to shortening measuring time.

A series of operations of the tester will be described with reference to FIG. 10. A servo pattern is generated on a disk by using the SSW card before starting the test. An automatic HGA transfer machine, not shown, operates according to commands given thereto by a DET control PC to load an HGA on the VCM actuator. The HGA is fixed to an end part of the arm by any one of the foregoing HGA fixing methods. AN HGA fixing procedure is carried out according to commands provided by the DET control PC. After the HGA has been fixed to the arm, the HDD card controls the VCM actuator to turn the arm to a starting position. The projection of the VCM actuator comes into contact with the hard stopper and the VCM holding spring presses the projection against the hard stopper. A VCM servo control operation specified by the HDD card is started and, at the same time, the test of the magnetic head is started. Test matters are BER, magnetic write width (MWW), magnetic read width (MRW), squeeze and overwrite. The function of a production channel and the microtracking function of the VCM servomechanism are used for the measurement of those parameters. The electronic circuit for recording and reproducing and the servo control circuit of the production HDD are used for testing the magnetic head.

The magnetic head tester of the present invention using those functions can operate similarly to the production HDD for the test. The testing procedure is reversed after the test has been completed.

Figure 11:
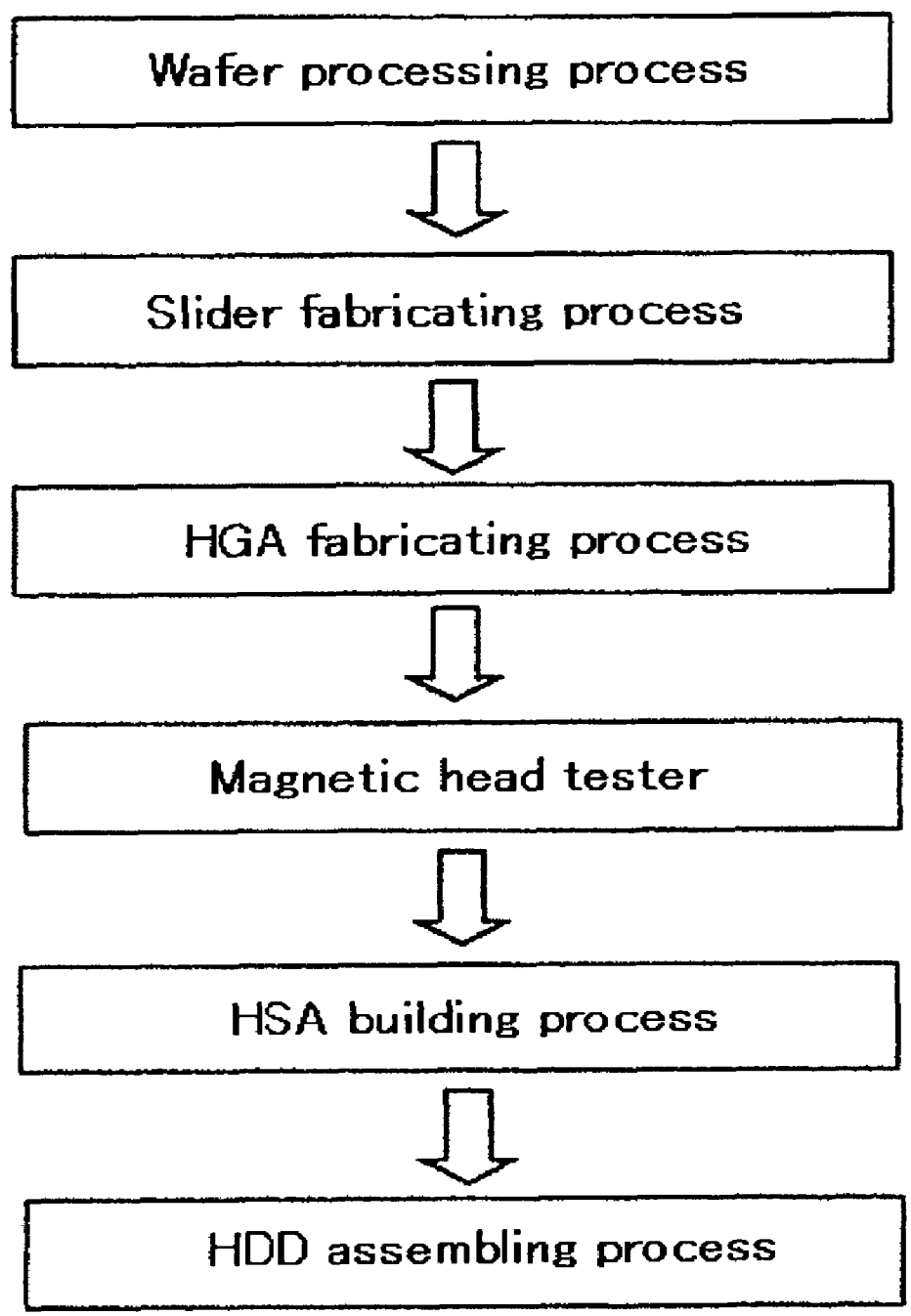
FIG. 11 is a flow chart of a magnetic disk drive fabricating process using the present invention.

FIG. 11 shows an HDD fabricating process with which the magnetic head tester of the present invention is related. A magnetic head fabricating process includes a wafer processing process including steps of forming a reproducing part and a recording part on a substrate, and a slider fabricating process including the steps of cutting the wafer into bars, polishing the bar to form a flying surface, cleaning the bar, forming a protective film on the bar and forming grooves in the flying surface. An HGA is made by an HGA fabricating process including the steps of attaching the magnetic head to a suspension and connecting the magnetic head to electric terminals. The magnetic head tester tests HGAs thus fabricated to select acceptable HGAs. An HSA building process attaches the selected, acceptable HGA to a member of a VCM mechanism to build an HSA. The HSA is installed in an HDD casing together with other components of an HDD including a magnetic disk, a spindle motor, a ramp mechanism and a filter for keeping the interior of the HDD clean. Then, an electronic circuit board is attached to the HDD casing to complete the HDD. The magnetic disk, the VCM actuator and the electronic circuit board are the same in shape and function as those employed in the magnetic head tester and are equivalent to those employed in the magnetic head tester. The magnetic head tester of the present invention selects better magnetic heads to improve the yield of an HDD manufacturing line and to provide improved HDDs.

As apparent from the description of the series of operation, the embodiments of the present invention are related with each other and the combination of those embodiments further enhances the advantages of the present invention.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic head tester comprising:
a magnetic disk for recording information as signals;
a rotative driving mechanism to rotate the magnetic disk;
a magnetic head for writing signals to and reading signals from the magnetic disk;
an HGA (head gimbals assembly) supporting the magnetic head above the magnetic disk; and
an HGA driving mechanism to drive the HGA;
wherein a VCM actuator employed in a production HDD (hard disk drive) is used for driving the HGA, an electronic circuit board employed in the production HDD is used for driving the VCM actuator, and an actuator arm included in the VCM actuator is provided with an automatic HGA fixing mechanism capable of detachably fixing the HGA to the actuator arm;
wherein the HGA fixing mechanism includes a holding spring disposed on an HGA holding part of the actuator arm and a stopper disposed on the actuator arm the holding spring presses a mount plate included in the HGA against the stopper to fix the HGA to the actuator arm, and the holding spring is pressed mechanically to release the HGA.

2. The magnetic head tester according to claim 1, wherein the actuator arm is provided with a positioning groove and a stopper to position the HGA on the actuator arm, the position of the HGA with respect to the length of the actuator arm is determined by bringing the mount plate into contact with the stopper, and the position of the HGA with respect to a direction perpendicular to the length of the actuator arm is determined by engaging the mount plate in the positioning groove.

3. The magnetic head tester according to claim 1, wherein the sum of respective masses of the holding spring and the stopper is not greater than the sum of the respective masses of the actuator arm and the HGA.

4. The magnetic head tester according to claim 1, wherein an air cylinder actuator, a cylinder housing and clamping arms are placed in an HGA holding part of the actuator arm, and the air cylinder actuator pulls the clamping arms down to fix the HGA to the HGA holding part and pushes the clamping arms up to release the HGA.

5. The magnetic head tester according to claim 4, wherein the sum of respective masses of the clamping arms, the air cylinder actuator and the cylinder housing is not greater than the sum of the respective masses of the actuator arm and the HGA 6. The magnetic head tester according to claim 1, wherein an air cylinder actuator, a cylinder housing and a clamping spring are placed in an HGA holding part of the actuator arm, the air cylinder actuator pulls the clamping spring down to fix the HGA to the HGA holding part and pushes the clamping spring up to release the HGA.

7. The magnetic head tester according to claim 6, wherein the sum of respective masses of the clamping spring, the air cylinder actuator and the cylinder housing is not greater than the sum of the respective masses of the actuator arm and the HGA.

8. The magnetic head tester according to claim 1, wherein a rubber clamping member is placed in an HGA holding part of the actuator arm, a port is formed in the HGA holding part of the actuator arm, air is supplied into the rubber clamping member to inflate the rubber clamping member, and air is discharged from the rubber clamping member through the port to deflate the rubber clamping member for fixing and releasing the HGA.

9. The magnetic head tester according to claim 8, wherein the sum of respective masses of the rubber clamping member and the port is not greater than the sum of the respective masses of the actuator arm and the HGA.

10. The magnetic head tester according to claim 1, wherein a coil included in the VCM actuator is provided on an outer surface thereof with a projection, a hard stopper is disposed in a part of the tester to stop the projection at a magnetic head testing position,and a VCM holding spring is turned to press the projection against the hard stopper after the projection has engaged with the hard stopper.

11. The magnetic head tester according to claim 1, wherein a servo pattern for the VCM actuator is generated on a surface of the magnetic disk by a self servo writing control circuit employed in the production HDD.

12. The magnetic head tester according to claim 1, wherein an electronic circuit for controlling recording and reproducing operations and an electronic servo control circuit included in the production HDD are used as an electronic testing circuit for testing a magnetic head.

13. A magnetic disk drive fabricating method comprising:
fabricating a magnetic head;
attaching the magnetic head to a suspension to build an HGA;
testing the HGA by a magnetic head tester;
attaching the HGA proved to be good by testing the HGA to a first VCM actuator; and
installing the magnetic disk, the first VCM actuator, and a spindle motor in a casing of an HDD and attaching a first electronic circuit board to the casing of the HDD;
wherein the magnetic head tester drives the HGA by a second VCM actuator equivalent to the first VCM actuator, drives the second VCM actuator by a second electronic circuit board equivalent to the first electronic circuit board, and an actuator arm included in the second VCM actuator is provided with an HGA fixing mechanism for detachably fixing the HGA to the actuator arm;
wherein the HGA fixing mechanism comprises a holding spring disposed on an HGA holding part of the actuator arm of the second VCM actuator and a stopper disposed on the actuator arm, the holding spring presses a mount plate included in the HGA against the stopper to fix the HGA to the actuator arm, and the holding spring is pressed mechanically to release the HGA.

14. The magnetic disk drive fabricating method according to claim 13 wherein an air cylinder actuator, a cylinder housing and clamping arms are placed in an HGA holding part of the actuator arm of the second VCM actuator, the air cylinder actuator pulls the clamping arms down to fix the HGA to the HGA holding part and pushes the clamping arms up to release the HGA.

15. The magnetic disk drive fabricating method according to claim 13 wherein an air cylinder actuator, a cylinder housing and a clamping spring are placed in an HGA holding part of the actuator arm of the second VCM actuator, the air cylinder actuator pulls the clamping spring down to fix the HGA to the HGA holding part and pushes the clamping spring up to release the HGA.

16. The magnetic disk drive fabricating method according to claim 13 wherein a rubber clamping member is placed in an HGA holding part of the actuator arm of the second VCM actuator, a port is formed in the HGA holding part of the actuator arm of the second VCM actuator, air is supplied into the rubber clamping member to inflate the rubber clamping member and air is discharged from the rubber clamping member through the port to deflate the rubber clamping member for fixing and releasing the HGA.

17. The magnetic disk drive fabricating method according to claim 13 wherein the magnetic head tester includes a first control circuit equivalent to a self servo writing control circuit employed in the production HDD, and the first control circuit generates a servo pattern for the VCM actuator on a surface of the magnetic disk.

18. The magnetic disk drive fabricating method according to claim 13 wherein the magnetic disk drive further comprises an electronic circuit for controlling recording and reproducing operations and an electronic servo control circuit, and circuits equivalent to the electronic circuit for controlling recording and reproducing operations and the electronic servo control circuit are formed in the magnetic head tester.

* * * * *

UNITED STATES PATENT AND TRADEMARK OFFICE
CERTIFICATE OF CORRECTION

PATENT NO. : 7,518,814 B2  Page 1 of 1
APPLICATION NO. : 11/515268
DATED : April 14, 2009
INVENTOR(S) : Umezaki et al.

It is certified that error appears in the above-identified patent and that said Letters Patent is hereby corrected as shown below:

Claim 13, column 10, line 52, please delete "an HGA" and insert --an automatic HGA--

Signed and Sealed this

Ninth Day of June, 2009

JOHN DOLL
*Acting Director of the United States Patent and Trademark Office*